April 1, 1930.   F. E. SMYTHE ET AL   1,752,463
LEVER LOCK
Filed Sept. 7, 1927
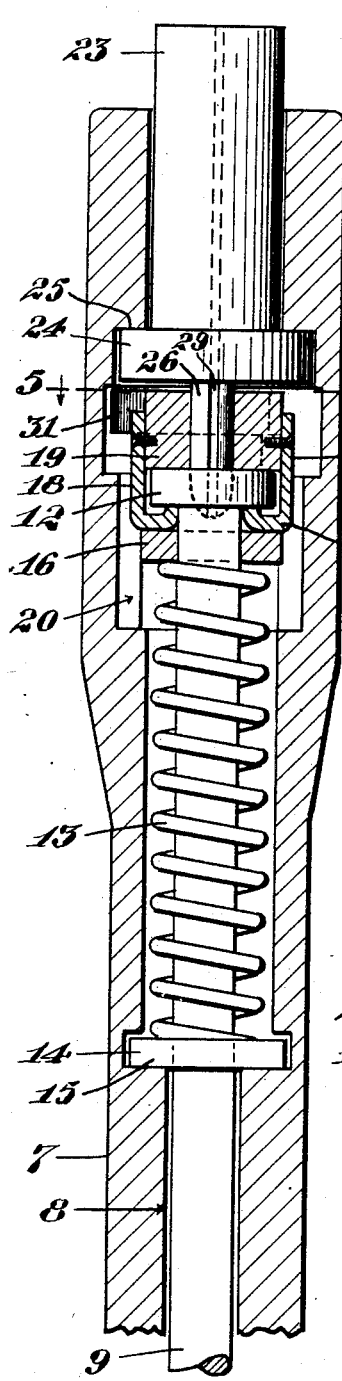
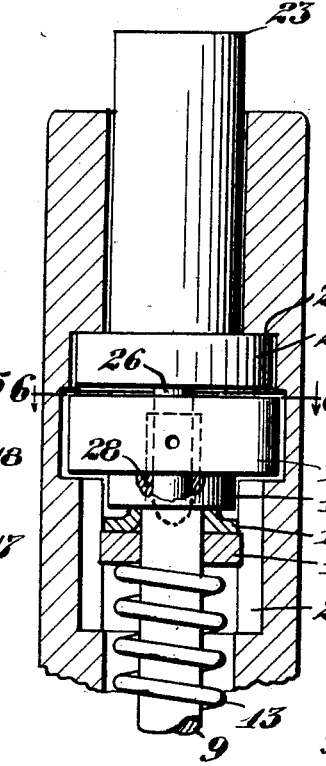
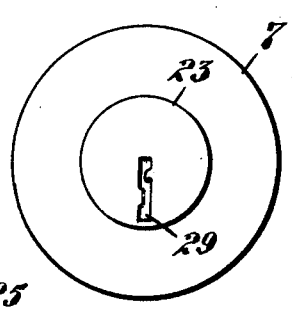
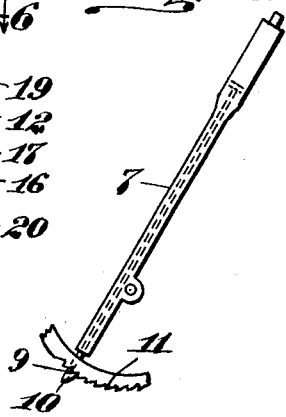
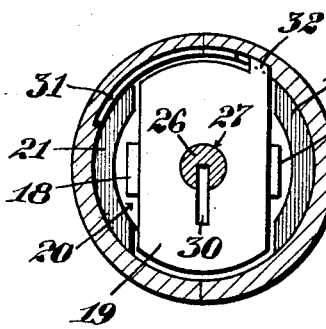
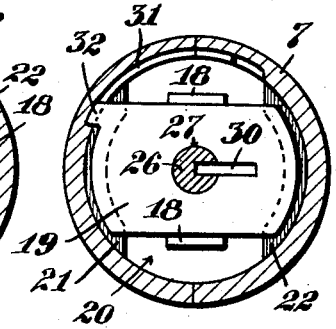
Inventors
Frank E. Smythe
and Albert Q. Smythe;
By N.W. Crandall
Attorney Patented Apr. 1, 1930

1,752,463

UNITED STATES PATENT OFFICE

FRANK E. SMYTHE AND ALBERT Q. SMYTHE, OF SAN DIEGO, CALIFORNIA, ASSIGNORS OF ONE-HALF TO ANDY ATLESON AND MAY ATLESON, OF LOS ANGELES, CALIFORNIA

LEVER LOCK

Application filed September 7, 1927. Serial No. 218,002.

This invention relates to a lever lock and more particularly pertains to a device for locking hand operated levers such as the brake levers and transmission control levers of motor vehicles.

An object of the invention is to provide a lever lock which while having general application to hand operated levers is particularly adapted to be employed on either or both the brake or transmission control levers of motor vehicles so as to enable locking such levers against unauthorized manipulation, thereby minimizing the possibility of theft of the vehicle.

Another object is to provide a lever lock in which longitudinal movement of a push rod may be key controlled and whereby the push rod may be locked against actuation.

Another object is to provide a lever lock of simple construction which may be readily assembled, which is economical in manufacture and which is efficient in operation.

With the foregoing objects in view together with such other objects and advantages as may subsequently appear, the invention resides generally in the provision of a lever fitted with a push rod controlling a latch and including a key controlled lock mechanism whereby the push lever may be locked against operation and thereby lock the lever against manipulation.

The invention resides in the parts and in the combination, construction and arrangement of parts as hereinafter described and claimed and illustrated by way of example in the accompanying drawings, in which:

Fig. 1 is a view in vertical section of the handle end of a lever showing the invention as applied and illustrating the parts in their unlocked position;

Fig. 2 is a detail in section similar to that of Fig. 1, showing the parts in their locked position;

Fig. 3 is a plan view of the lever shown in Fig. 1;

Fig. 4 is a diagrammatic view in elevation illustrating the invention as applied to a brake lever;

Fig. 5 is a detail in cross section as seen on the line 5—5 of Fig. 1;

Fig. 6 is a detail in cross section as seen on the line 6—6 of Fig. 2.

Referring to the drawings more specifically, 7 indicates a lever which is formed with a longitudinal bore 8 in which is mounted, for reciprocal movement, a push rod 9. The lower end of the push rod is here shown as fitted with a catch 10 which may be of any suitable construction and is adapted to normally engage a recess to hold the lever against operation; the latch engaging ratchet teeth 11 as here shown and being disengageable therefrom on downward movement of the push rod. The upper end of the push rod is formed with a head 12 spaced inwardly from the upper end of the lever, and bearing between the lever shank and the head of the push rod is a spring 13 arranged to exert an upward push on the push rod to maintain the catch 10 in the lever locking position. The spring 13 is shown as wound spirally around the push rod with its lower end bearing against a washer 14 seating on a shoulder 15 formed interiorly of the lever. A washer 16 encircles the push rod adjacent the head 12 and forms a seat for the upper end of the spring 13. Interposed between the head 12 and the washer 16 is an annulus 17 which is freely turnable on the push rod and is connected by upstanding side flanges 18 to a block 19 revolubly seating on the upper end of the push rod. The head portion of the push rod together with the block 19 are arranged within a chamber 20 formed in the handle portion of the lever; the opposite side walls of which chamber are formed with ledges or shoulders 21 and 22 which are spaced apart at their contiguous ends. The block 19 is normally positioned so that its under side extends on a plane slightly above the shoulders 21 and 22, and is of such length as to afford projecting end portions that are adapted to extend over the shoulders to prevent depression of the push rod; the block however being formed of such width that when properly positioned, it may pass between the shoulders 21 and 22 and then permit depression of the push rod.

Mounted in the outer end of the lever is a revoluble push button 23, the inner end of which is formed with a flange 24 arranged to abut against an internal shoulder 25 on the lever to limit outward movement of the push button. The inner end of the push button is formed with a central cylindrical extension 26 which projects through a bore in the block 19 and seats in a socket 20 formed in the upper end of the push rod. The push button 23 with its extension 26 is formed with an irregular key receiving slot 29 and the block 19 is formed with a slot 30 leading from the bore 27 and adapted to register with a portion of slot 29 opening through the side of the extension 26. A key is provided for insertion in the slot, being formed of such length and cross section that when inserted through the push button and into the extension 26 the end of the key will engage the block 19 so that on rotation of the key the block 19 may be turned to the unlocking position shown in Figs. 1 and 5 and then permit depression of the push button, or turned to the locking position shown in Figs. 2 and 6 with the end portions of the block 19 projecting over the shoulders 21 and 22 which will inhibit depression of the push rod. As a means for insuring proper positioning of the block 19, in either its unlocking or locking position, the walls of the chamber 20 are formed with a channel 31 into which a lug 32 on the end of the block 19 projects, the ends of the channel 31 serving as abutments cooperating with the lug 32, to limit the rotary movement of the block 19 in either direction. The channel 31 is of such width at one end that when the block 19 is disposed in the unlocked position as shown in Fig. 5, the lugs 32 may move downwardly on depression of the block 19.

The spring 13 bearing against the washer 16 clamps the annulus 17 between the washer 16 and the head 12 which, because of the connection between the annulus and the block 19 holds the latter against free turning movement and yieldably opposes its rotation. Turning of the block 19 is further opposed by reason of the lug 32 bearing against the upper margin of the channel 31. The end of the extension 26 on the push button seats in the socket 28 in the push rod and a clearance is provided between the upper face of the block 19 and the inner end of the push button, thus obviating frictional contact between the push button and the block such as would render it possible to turn the block on rotating the push button without the aid of a key; the seating of the stem 26 on the push rod preventing depression of the push button with relation to the block and maintaining the block and push button in spaced relation.

In order to facilitate assemblage of the lock elements, the lever 7 is formed of sections or halves which are placed astride the push rod and the lock elements and are suitably connected together.

We claim:

1. In a lever lock, the combination of a lever, a push rod carried by said lever, a spring normally maintaining the push rod in a retracted position, means operable by said push rod when in its retracted position to hold the lever against movement in at least one direction, a turnable push button operable on being depressed to effect advance of said rod in opposition to said spring, said push button being formed with a key-receiving slot, and key controlled mechanism interposed between said push button and push rod operable to prevent actuation of the push rod through said push button, and adapted to be turned by a key inserted through the push button to permit actuation of the push rod through said push button.

2. In a lever lock, the combination of a lever, a push rod carried by the lever, a spring normally holding the push rod in a retracted position for normally holding the lever against movement in at least one direction, a contacting push button operable to effect advance of the push rod in opposition to said spring force, said push button being formed with a key receiving slot, and a locking element interposed between the push button and the push rod operable to effect connection between the push rod and the lever and to effect disconnection thereof, said locking element being formed with a key receiving slot arranged to be engaged by a key positioned in the key receiving slot of the push button.

3. In a lever lock, the combination of a lever, a push rod carried by said lever, a spring normally maintaining the push rod in a retracted position, means controlled by said push rod for normally holding the lever against movement in at least one direction when the push rod is in its retracted position, a block carried on the end of the push rod arranged within the lever and having a central opening, a contacting push button carried by the lever having a cylindrical extension projecting through the opening in said block and bearing against the upper end of the push rod, said push button being formed with a key receiving slot extending into said projection and opening to the side of the latter, said block being formed with a slot registering with the slot in said projection whereby a key inserted through said push button will effect engagement between the said push button and the block, and a pair of spaced shoulders interiorly of said lever; said block cooperating with said shoulders when positioned to extend thereover to prevent depression of the push rod and being adapted to be disposed to clear said shoulder and permit depression of said push rod.

4. In a lever lock, a lever, a push rod carried by said lever, a head on said push rod, an annulus encircling said push rod, a spring maintaining said annulus in frictional engagement with said head, a block extending over the head of the push rod and affixed to the annulus, a push button carried by the lever having an end extension projecting through said slot and seating on said push rod, said push button and slot being spaced apart, means for effecting key engagement between the push button and block, whereby the latter may be turned to either of two positions, and means cooperating with said block when in one of said positions to inhibit advance of the push rod.

In testimony whereof, we have affixed our signatures.

FRANK E. SMYTHE.
ALBERT Q. SMYTHE.